United States Patent [19]
Kogure

[11] Patent Number: 5,835,534
[45] Date of Patent: Nov. 10, 1998

[54] INTRINSICALLY SAFE BARRIER AND FIELD BUS SYSTEM

[75] Inventor: Makoto Kogure, Hitachinaka, Japan

[73] Assignee: Hitachi, Ltd., Tokyo, Japan

[21] Appl. No.: 699,829

[22] Filed: Aug. 20, 1996

[30] Foreign Application Priority Data

Aug. 25, 1995 [JP] Japan .................................. 7-217046

[51] Int. Cl.⁶ .................................................. H04B 3/00
[52] U.S. Cl. ................. 375/257; 340/310.01; 340/660; 340/664; 361/58
[58] Field of Search ..................... 375/257, 258, 375/282, 333, 377; 379/400, 414–416; 340/310.01, 660, 664; 361/54–58, 77, 82, 84, 91, 104

[56] References Cited

U.S. PATENT DOCUMENTS 3,973,170  8/1976  Hogan ........................................ 361/41
5,144,517  9/1992  Wieth ........................................ 361/55
5,684,831  11/1997  Moller ....................................... 375/257

FOREIGN PATENT DOCUMENTS 541709A  2/1993  Japan .

OTHER PUBLICATIONS

Pepperl & Fuchs, three sheets.
MTL700 Series, 1994–95, pp. 35 and 36.

*Primary Examiner*—Amanda Le
*Attorney, Agent, or Firm*—Kenyon & Kenyon

[57] ABSTRACT

In a field bus system for performing communication between at least one field device and at least one higher-rank apparatus which are connected on a field bus transmission line constituted by a pair of transmission lines, an intrinsically safe barrier disposed between a hazardous area and a safe area on the transmission line in order to limit energy to be used in the hazardous area, the intrinsically safe barrier comprising impedance converting circuits provided in the barrier for reducing impedance in a frequency band of communication data.

20 Claims, 8 Drawing Sheets

FIELD SIDE

FIG.4C

INSTRUMENT-ROOM SIDE

INTRINSICALLY SAFE BARRIER AND FIELD BUS SYSTEM

BACKGROUND OF THE INVENTION

1. Field of the Invention

The present invention relates to a field bus system for performing signal transmission through a pair of transmission lines, and, particularly, it relates to an intrinsically safe barrier adapted to field bus communication in which extension of allowable transmission distance under an intrinsically safe condition can be made by a simple circuit structure.

2. Description of the Related Art

So-called field devices are generally used so that the field devices detect physical quantities, such as a pressure, a temperature, a flow rate, and the like, in various kinds of plants, convert the detected values of such physical quantities into electric signals, and transmit the electric signals to higher-rank measuring instruments through a transmission line. Contrarily to this, the field devices receive control signals transmitted from the higher-rank measuring instruments to thereby control valves or the like in the plants.

In the case where the electric signals are analog signals, the transmission of those electric signals is standardized so that analog current signals of 4 to 20 mA are transmitted between the field devices and the higher-rank measuring instruments. In general, communication between the field devices and the higher-rank measuring instruments is one-way communication with analog signals.

In recent years, however, field devices with built-in microprocessors have been developed and put into practice with the advance of the semiconductor integrated circuit technique (IC technique). According to the developed field devices, not only one-way communication with analog signals can be performed on the transmission line but also two-way communication with digital signals can be performed on the transmission line, so that range setting, self diagnosis, etc., of the field devices can be remotely instructed.

Recently, a field bus system has been proposed as a system in which a plurality of field devices are connected onto one and the same transmission line by means of multi-dropping to perform two-way communication only with digital signals.

A typical example of the configuration of such a field bus system will be described hereunder with reference to FIG. 2.

Figure 2:
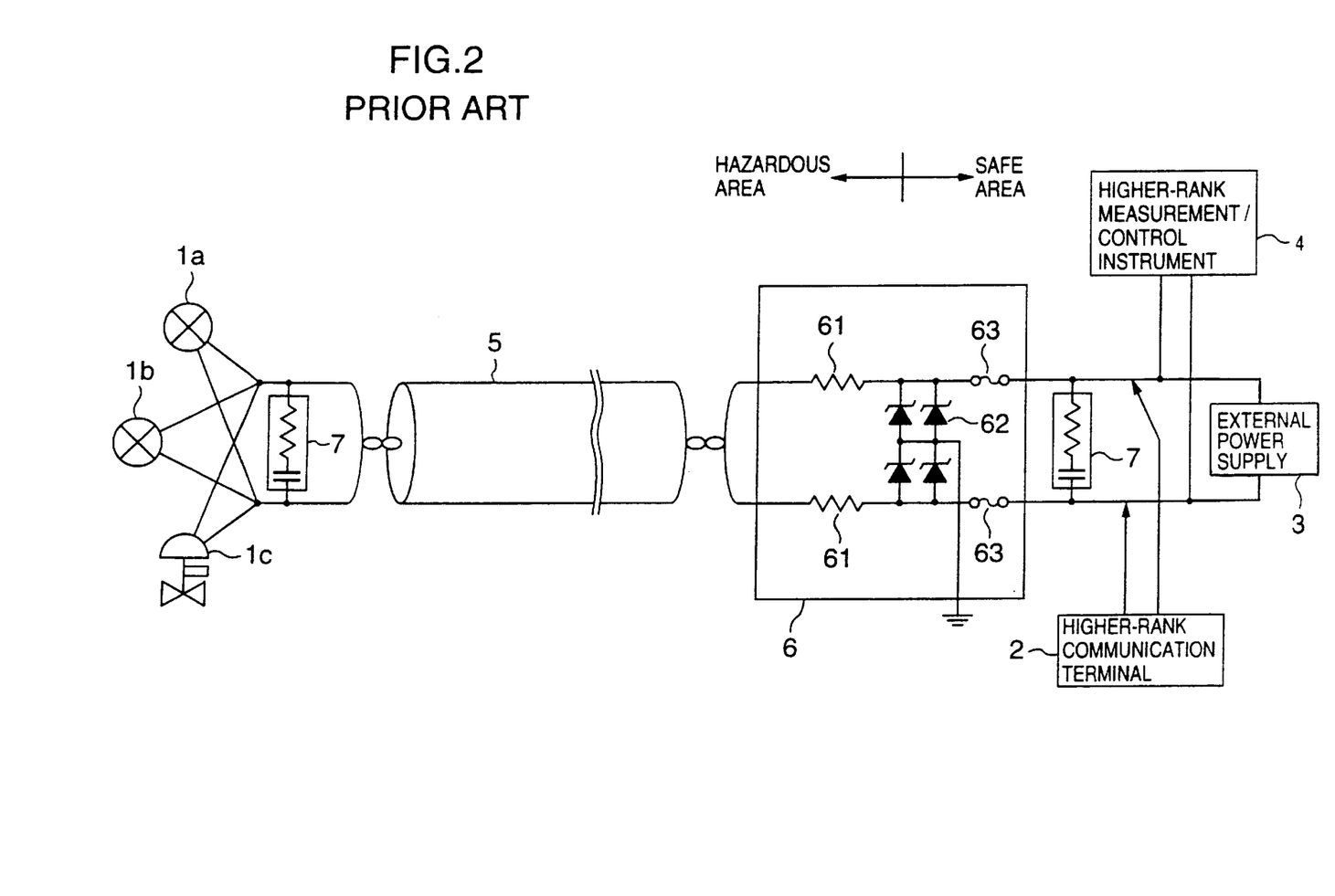
FIG. 2 is a diagram showing an example of the configuration of a field bus system using a conventional barrier.

FIG. 2 shows an example of the configuration of a system in which a plurality of field devices are connected, in the form of a tree, to higher-rank measuring instruments through a transmission line. Field devices 1a, 1b and 1c are operated by electric power supplied from an external power supply 3 through a transmission line 5 so that two-way communication between these field devices 1a, 1b and 1c and a higher-rank measuring instrument 4 are successively performed with digital signals on a transmission line 5 for the double purpose of transmitting detected physical quantities and receiving control values, or the like. A higher-rank communication apparatus 2 is connected between a set of the field devices 1a, 1b and 1c and a set of the higher-rank measuring instrument 4 and the external power supply 3 and performs two-way communication between the field device 1a, 1b, 1c, etc. and the higher-rank communication apparatus 2 with digital signals. Terminators 7, each of which is constituted by a resistor and a capacitor connected in series with each other, are disposed at the opposite ends of the transmission line 5. Under an intrinsically safe condition, a barrier 6 is disposed between a hazardous area and a safe area so that energy used in the hazardous area does not exceed a predetermined value.

From the point of view of digital communication, compared with the existing system, the aforementioned field bus system for performing two-way communication with digital signals requires consideration of reliability against noise. Furthermore, the aforementioned field bus system has a problem that, when communication failure occurs frequently, the control of the field devices which has been carried out periodically so far cannot be made any more.

Particularly, under the consideration of the characteristic of the transmission line which has a long transmission distance so that attenuation and distortion of a communication signal vary depending on the conditions, when compared with a general communication network, and under the consideration of noise environment in which the system is placed in the field, the levels of signals transmitted by the respective apparatuses are selected to be a large value in a range of from 0.75 to 1.0 Vp-p and the levels of signals allowed to be received by the respective apparatuses are selected to be in a wide range of from 0.15 to 2.0 Vp-p according to the standard. Because the field devices are supplied with operating electric power through the transmission line, the transmission signals are electric current signals in a range of from 15 to 20 mAp-p. To prevent a current from flowing reversely at the time of communication while the transmission current signals are equal in amplitude, it is necessary that the current consumed by the field devices is selected to be not smaller than about 8 mA.

In the case where the system is changed from an existing analog signal system into such a field bus system, it is necessary that the higher-rank apparatuses and the field devices are replaced by new ones adapted to the field bus. The transmission line 5, however, can be used without any change. Accordingly, not only the system can be changed easily but also the number of field devices connected onto the transmission line 5 can be increased. As a result, it is said that system extension is made easily.

In the aforementioned prior art, however, energy used in one transmission line under the intrinsically safe condition is limited. Assuming now that the current is limited up to 36 mA and that the current consumed by one field apparatus is 8 mA, then there arises a problem that the number of field devices allowed to be connected onto one transmission line is four at maximum, consequently. As a measure to solve this problem, a method of reducing the current consumed by field devices has been proposed in JP-A-5-41709, and the like.

In the aforementioned proposed method, the number of field devices allowed to be connected onto one transmission line can be increased by reducing the current consumed by the field devices. There is however no detailed description about the barrier and there is no consideration to attenuation of signals used for communication between the higher-rank apparatuses and the field devices through the barrier.

Generally, the conventional barrier 6 is formed to have such a configuration as shown in FIG. 2.

In the barrier 6 shown in FIG. 2, the internal resistance value of the barrier 6 is about 120 Ω which is the sum of the resistance value of resistors 61 and the resistance value of fuses 63. This acts on communication virtually as if the length of the transmission line 5 is increased. As a result, signals used for communication between the higher-rank apparatuses and the field devices are attenuated largely.

When, for example, a transmission line with a sectional area of 1.25 mm² is used, the loop resistance of the transmission line is 35 Ω/km. Because the maximum transmission line length defined by the field bus standard is 1800 m, the calculated resistance value of the transmission line is 63 Ω. Accordingly, because the internal resistance value of the barrier 6 shown in FIG. 2 is about 120 Ω, resistance corresponding to about 3.5 km which is larger than the maximum transmission line length of 1.8 km must be generated in the barrier 6.

Accordingly, there arises a problem that both the length of the transmission line allowed to be actually used and the number of field devices allowed to be actually connected are limited from the point of view of reliability on communication.

Figure 3:
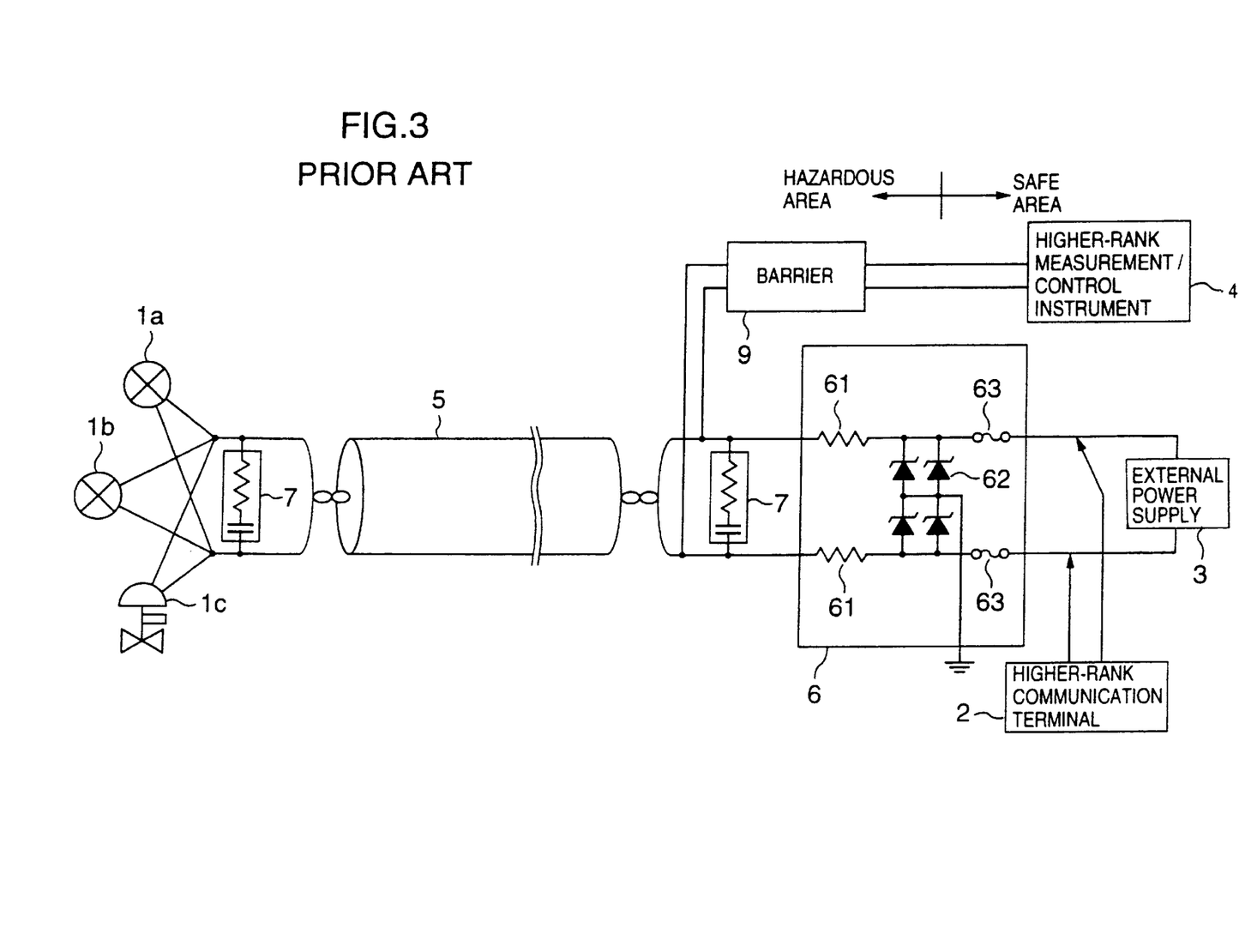
FIG. 3 is a diagram showing another example of the configuration of a field bus system using a conventional barrier.

In another conventional example of the field bus system shown in FIG. 3, a method of connecting the terminators 7 and the higher-rank measurement/control instrument 4 on the transmission line in the hazardous area is employed in order to solve the aforementioned problem. The method however has other problems as follows.

1. Because two terminators are connected in the hazardous area so that capacitance is increased, the intrinsically safe system is hardly formed.
2. Another barrier 9 must be provided between the higher-rank measurement/control instrument 4 and the transmission line.
3. Because the higher-rank communication terminal 2 is connected in the safe area, the aforementioned problem cannot be solved. To connect the higher-rank communication terminal 2 in the hazardous area, it is necessary that barriers are provided individually in the same manner as in the above item 2.

SUMMARY OF THE INVENTION

An object of the present invention is therefore to provide a barrier adapted to a field bus, in which conditional ranges such as the length of the transmission line allowed to be used for communication and the number of field devices allowed to be connected can be extended under an intrinsically safe condition so that the aforementioned problem is solved by a simple circuit structure.

The foregoing object of the invention is achieved by a field bus system for performing communication between at least one field apparatus and at least one higher-rank apparatus which are connected onto a field bus transmission line constituted by a pair of transmission lines, in which an intrinsically safe barrier disposed between a hazardous area and a safe area on the transmission line in order to limit energy to be used in the hazardous area has impedance converting circuits provided in its inside to reduce impedance in a frequency band of communication data.

In the field bus system using such an intrinsically safe barrier according to the invention, resistors are included in the barrier in order to suppress an excessive current from flowing in the transmission line in case of failure, for example, when the transmission line is short-circuited in the hazardous area. Further, in the field bus communication, the communication bit rate is 31.25 kbps, so that the frequency band used in communication is limited regardless of the contents of data such as Manchester code data.

Therefore, circuits for reducing impedance in the communication frequency band are connected in parallel to the aforementioned resistors to thereby make it possible not only to suppress an excessive current from flowing in the transmission line but also to prevent the communication signals from being attenuated largely.

DESCRIPTION OF THE PREFERRED EMBODIMENTS

The present invention will be described hereunder with reference to the drawings.

Figure 7:
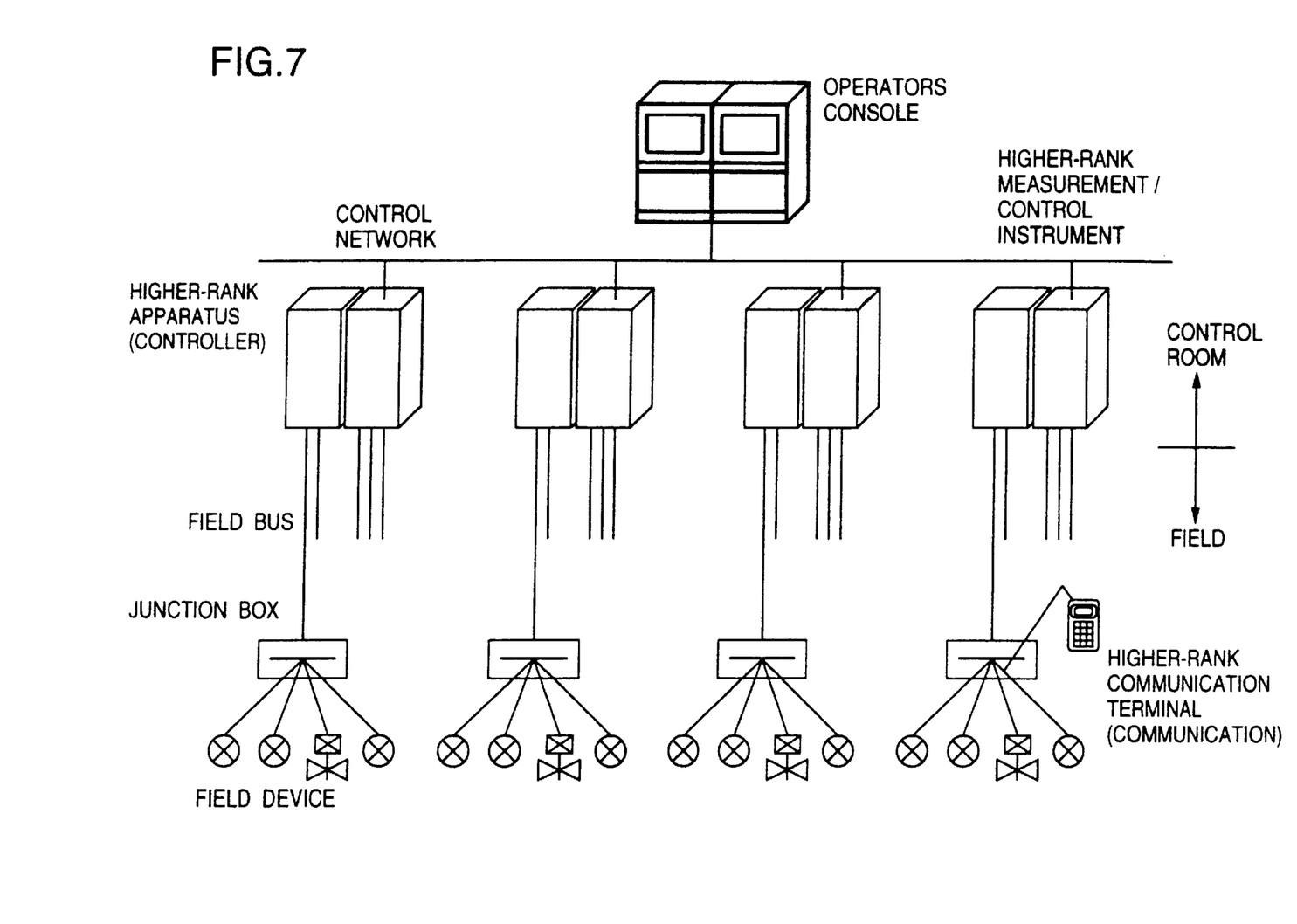
FIG. 7 is a diagram showing the configuration of a measurement control system.

FIG. 7 shows an example of a measurement control system to which an intrinsically safe barrier according to the present invention is applied. Higher-rank side apparatuses for monitoring/controlling the whole of a plant, that is, an operator's console disposed in a control room, higher-rank apparatuses (controllers), a control network for connection thereof, etc., and field devices disposed on the field side (plant site) are connected by a transmission line constituted by a pair of transmission lines to thus form a field bus system.

Intrinsically safe barriers are placed in the boundary between the control room as a safe area and the plant site as a hazardous area and generally connected to the aforementioned higher-rank apparatuses (controllers) respectively.

Figure 1:
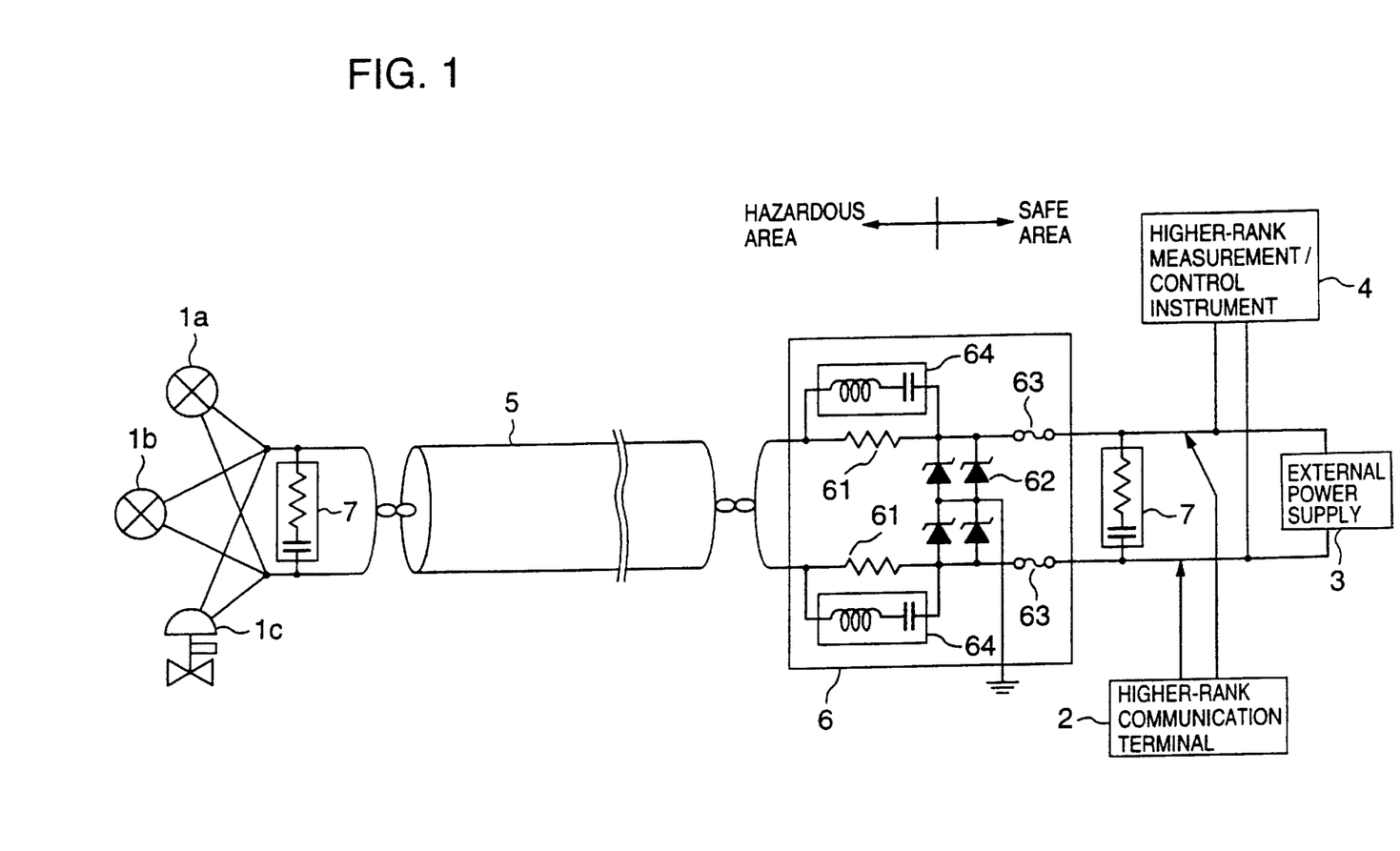
FIG. 1 is a diagram showing the configuration of a field bus system using a low impedance barrier according to a first embodiment of the present invention.

FIG. 1 shows an example of the configuration of a field bus system using an intrinsically safe barrier, according to a first embodiment of the present invention.

In FIG. 1, field devices 1a, 1b and 1c perform two-way communication with digital signals. For example, whereby the field devices 1a, 1b and 1c serve to transmit detection values obtained by detecting physical quantities, such as a pressure, a temperature, a flow rate, etc., in a process in each of various kinds of plants or serve to receive control quantities for controlling valves or the like in the plant.

The field devices 1a, 1b and 1c are operated by electric power supplied from an external power supply 3 through a transmission line 5 so that each of the field devices 1a, 1b and 1c can be connected to a desired point of said transmission line 5.

Although this embodiment shows the case where the field devices 1a, 1b and 1c are connected in a field-side junction box (relay box), the present invention can be applied also to the case where the field devices 1a, 1b and 1c are connected at another point, for example, at an intermediate point of the transmission line 5.

A barrier 6 is connected between a hazardous area and a safe area under an intrinsically safe condition to thereby limit a current which flows from the external power supply 3 to the field device side through the transmission line 5. The maximum number of field devices to be connected depends on the relation between the output current allowed by the barrier 6 and the current consumed by the field devices.

A higher-rank apparatus 4 performs communication with the apparatuses (the field devices 1a, 1b and 1c, the higher-rank communication apparatus 2, etc.) adapted to the field bus by use of digital signals through the transmission line 5, so that the higher-rank apparatus 4 receives various kinds of physical quantities (such as a pressure, a temperature, a flow rate, etc.) detected by the field devices or transmits control signals to the field devices such as valves or the like, as plant control information.

The higher-rank communication apparatus 2 can be connected to a desired position on the transmission line 5. The higher-rank communication apparatus 2 performs communication through the transmission line 5 while operating a display or a keyboard in the higher-rank communication terminal 2 to thereby execute monitoring, adjusting and the like, of the output values from the field devices 1a, 1b and 1c.

Under the intrinsically safe condition, the higher-rank communication terminal 2 is connected in the safe area.

Terminators 7 each of which is constituted by a resistor and a capacitor connected in series, are connected to the transmission line 5 at its opposite ends. The terminators 7 are set to have impedance which is considerably small compared with the input impedance in a communication frequency band of the field devices connected on the transmission line 5, so that the influence of the condition such as the points of connection of field devices, the number of field devices connected, etc., on the communication signals is suppressed.

Accordingly, when one of the terminators is disconnected from the transmission line, the impedance of the transmission line 5 with respect to the field devices becomes large so that the level of a signal transmitted from each of the field devices increases.

Incidentally, even in the case where the levels of signals transmitted from the field devices connected to the field bus are constant, the levels of the signals at respective points on the transmission line are different unevenly in accordance with the condition such as the system of the driver circuits for driving the field devices, the length of the transmission line, the form of connection, etc. The terminators are disposed on the safe area side and on the hazardous area side, respectively, with respect to the barrier 6 to reduce capacitance on the hazardous area side to form the intrinsically safe system easily. That is, the configuration is made so that it is not required to dispose both the two terminators on the hazardous area side.

The operation of the barrier 6 will be described hereunder.

Zener diodes 62 serve to limit a voltage supplied from the external power supply 3 to a predetermined value when the voltage is applied to the transmission line 5 through the barrier 6. Generally, a plurality of Zener diodes 62 are connected in parallel as shown in FIG. 1 to satisfy the aforementioned function even in the case where failure occurs in one of the Zener diodes 62.

Fuses 63 serve to protect excessive electric power consumed by the Zener diodes 62 at the time of occurrence of failure.

Resistors 61 serve to suppress an excessive current from flowing in the transmission line 5 in case of failure, for example, when the transmission line 5 is short-circuited in the hazardous area. Accordingly, by means of the Zener diodes 62 and the resistor 61, the line voltage of the transmission line 5 and the line current flowing in the transmission line 5 can be suppressed so as not to be larger than predetermined values, respectively. As a result, energy allowed to be used in the hazardous area can be always suppressed so as not to be larger than a predetermined value.

The intrinsically safe system is provided by controlling the aforementioned predetermined values of energy to be in a level so that the gas or vapor to be subjected is not ignited.

By the aforementioned reason, in the field bus system adapted to intrinsic safety, not only the current used in the field devices 1a, 1b and 1c through the transmission line 5 is limited but also the number of field devices 1a, 1b and 1c allowed to be connected is limited. Therefore, a measure to reduce electric power consumed by field devices is discussed in order to increase the number of field devices allowed to be connected. Communication signals are, however, attenuated largely because of the internal resistance of the barrier 6 inclusive of the resistors 61 and the fuses 63. Accordingly, both the length of the transmission line 5 allowed to be used and the number of field devices allowed to be connected are limited.

The outline of the aforementioned problem will be described hereunder with reference to FIGS. 4A through 4C.

Figure 4A:
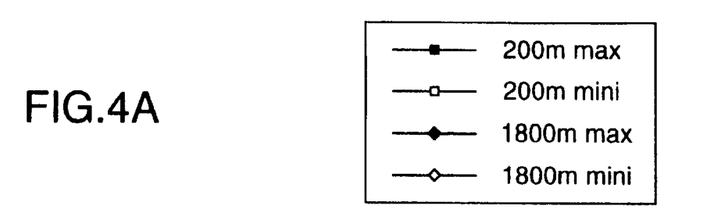
FIG. 4A is a view for explaining characteristic curves of FIGS. 4B and 4C.
Figure 4B:
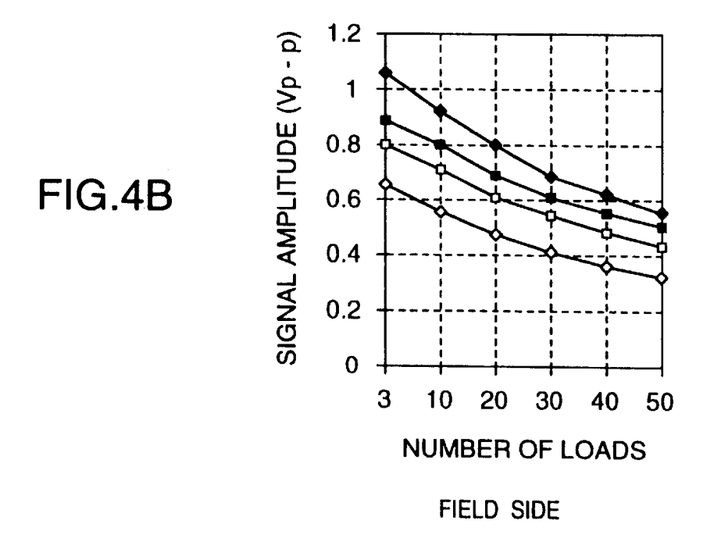
FIGS. 4B and 4C are graphs showing examples of attenuation characteristic of communication signals on the field side and on the measuring-instrument room side respectively.
Figure 4C:
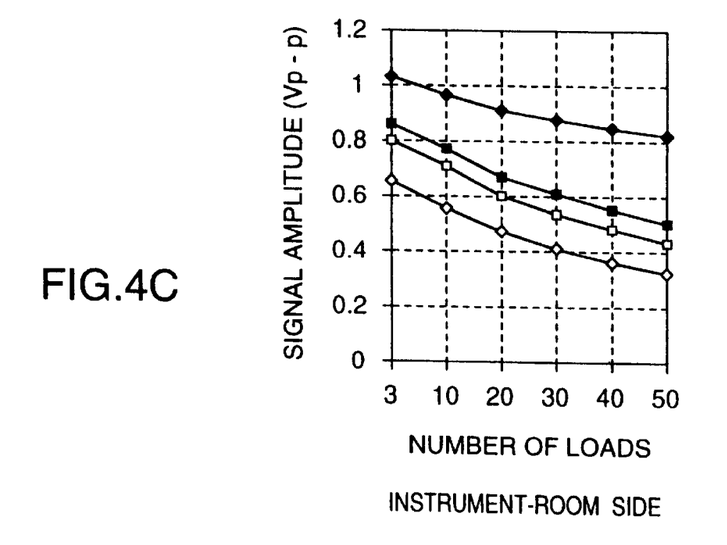

FIGS. 4A to 4C show the case where the barrier 6 is removed from the system configuration of FIG. 1. In FIGS. 4A to 4C, the maximum and minimum values of reception signals measured both on the measuring-instrument room side in which higher-rank apparatuses are disposed and on the field side in which field devices are disposed are shown by using, as parameters, the number (3 to 50) of the load apparatuses connected and the length (200 m or 180 m) of the transmission line, in a state in which the level of the transmission current signal is made to be 20 mAp-p.

Here, the internal resistance value of the barrier 6 is the sum of the resistance value of the resistors 61 and the resistance value of the fuses 63, so that the internal resistance value of the barrier 6 is generally about 120 Ω. This internal resistance value acts on communication virtually as if the length of the transmission line 5 is increased. As a result, signals used for communication between the higher-rank apparatuses and the field devices are attenuated largely. When, for example, a transmission line with a sectional area of 1.25 mm$^2$ is used, the loop resistance of the transmission line is about 35 Ω/km so that resistance corresponding to about 3.5 km of transmission line which is larger than the maximum transmission line length of 1.8 km defined by the field bus standard is generated in the barrier 6.

It is, therefore, necessary that the minimum value of the reception signal in FIGS. 4A to 4C is selected to have a sufficient margin compared with the minimum reception sensitivity of 0.15 Vp-p defined by the field bus standard. Accordingly, in the conventional system configuration shown in FIG. 2, the level of the signal is attenuated to be in a range in which reliability on communication becomes a problem when the number of field devices to be connected reaches 10 even in the case where the actual length of the transmission line is 0 km.

In the present invention, the total impedance of the barrier 6 in the communication frequency band is reduced by connecting the impedance converting circuits 64 in parallel to the resistors 61 respectively. By this measure, the barrier 6 can suppress such a phenomenon that the length of the transmission line is virtually increased so that the communication signal is attenuated largely. There arises an effect that not only the length of the transmission line allowed to be used under the intrinsically safe condition can be increased but also the number of field devices allowed to be connected can be increased.

Another effect of the present invention is that reliability on communication may be improved because the level of the communication signal can be suppressed from being attenuated.

Figure 8:
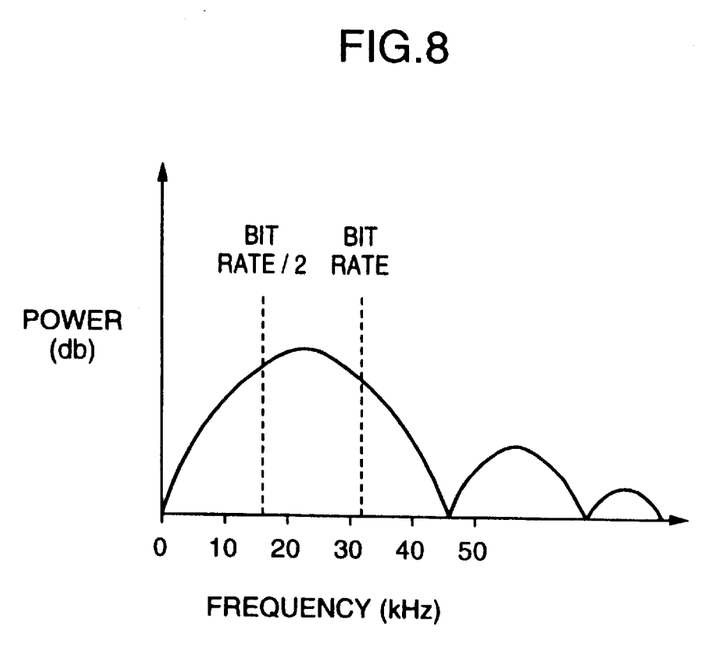
FIG. 8 is a graph showing the power distribution of Manchester code.
Figure 9:
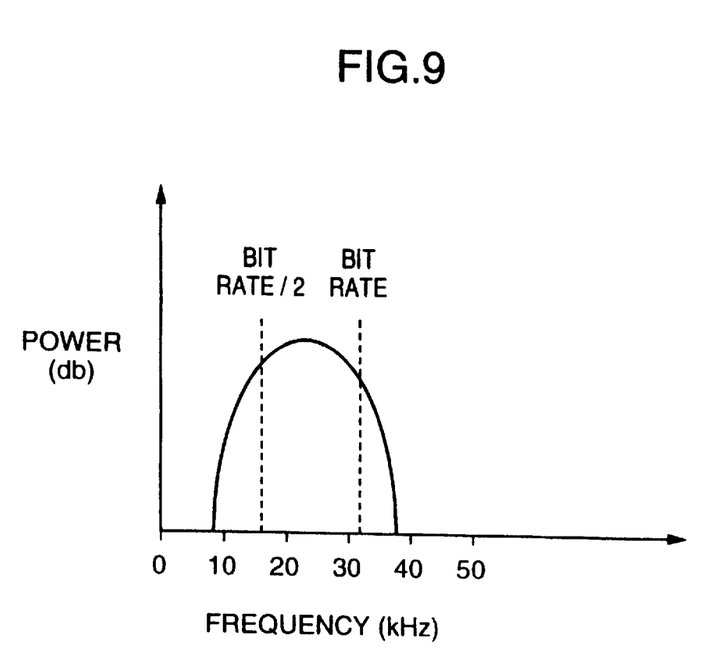
FIG. 9 is a graph showing the power distribution of a field bus signal.

In the field bus, Manchester code is used as communication data and the communication rate is 31.25 kbps. Assuming now that the waveform of the communication signal is rectangular, then the power distribution of the Manchester code is as follows. From the characteristic of the coding method of the Manchester code, power at 31.25 Hz which is a frequency in the communication bit rate and power at 15.625 Hz which is a half of the frequency occupy a larger part of the power distribution as shown in FIG. 8. As a whole, there is obtained a distribution composed of not only the sum of power at 31.25 Hz and power at 15.625 Hz, but also the power of the harmonic components which may occur therefrom. The actual waveform of the communication signal on the field bus is made to be a trapezoid on the standard so that noise is not generated in the outside and so that the aforementioned harmonic components are not generated. Accordingly, as shown in FIG. 9, power is distributed so that almost part of thereof is in a band of from 9 kHz to 39 kHz. Accordingly, it is sufficient if the frequency band to reduce the impedance of the barrier may cover a band of from about 9 kHz to 39 kHz. Therefore, the impedance converting circuit 64 as shown in FIG. 1 can be constituted by a capacitor, an inductor, and a safety holding part, with a further effect that the aforementioned circuit can be realized by a simple circuit structure. Here, to configure intrinsic safety, it is necessary to provide the Zener diodes 62 doubly as shown in FIG. 1 or to provide an integrated structure in which a safety holding part (not shown) such as a resistor, or the like, which is connected in series to the capacitor in order to prevent an excessive current from flowing at the time of short-circuiting of the capacitor.

Second and third embodiments of the present invention will be described with reference to FIGS. 5 and 6, respectively.

Figure 5:
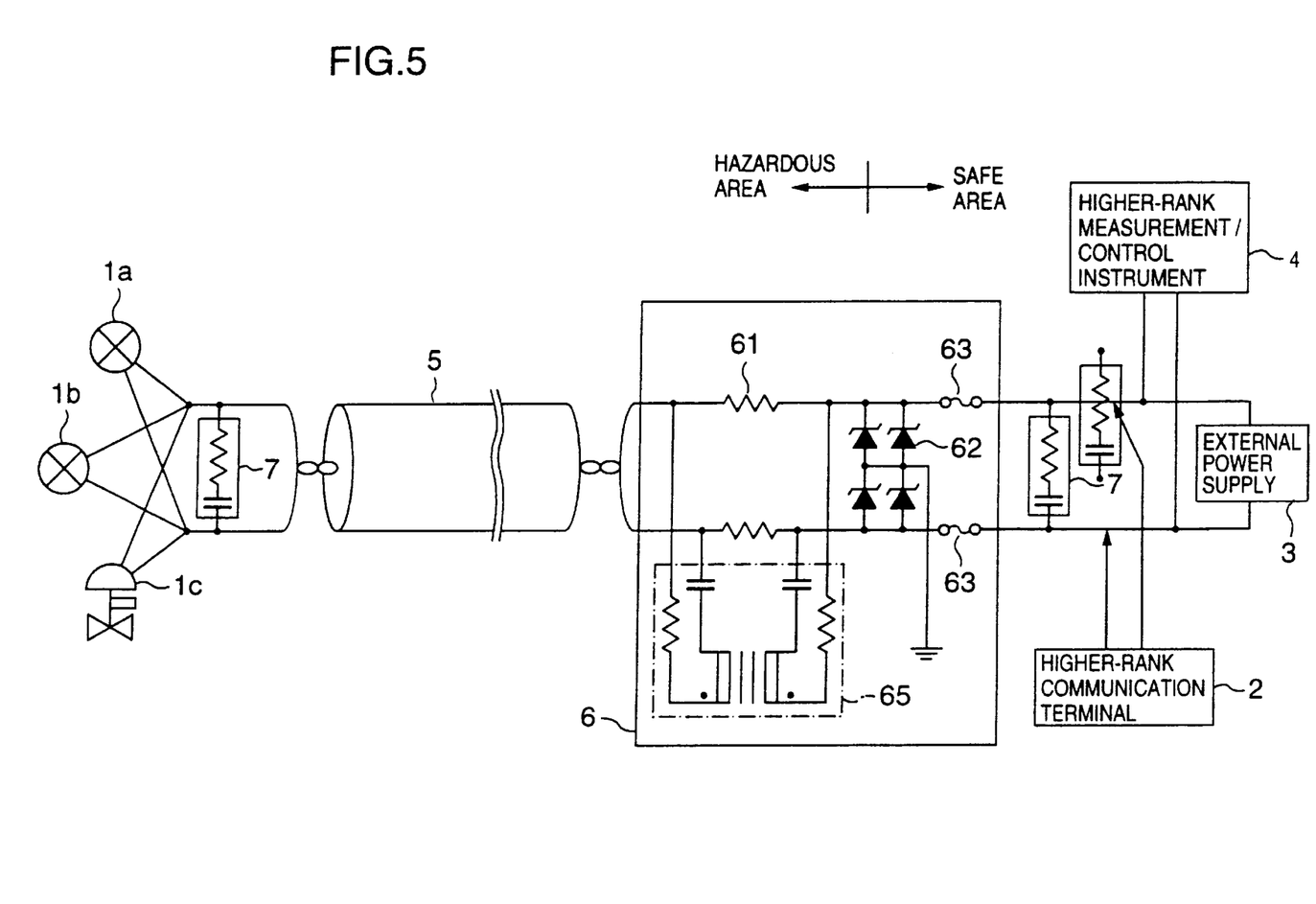
FIG. 5 shows a second embodiment of the present invention.
Figure 6:
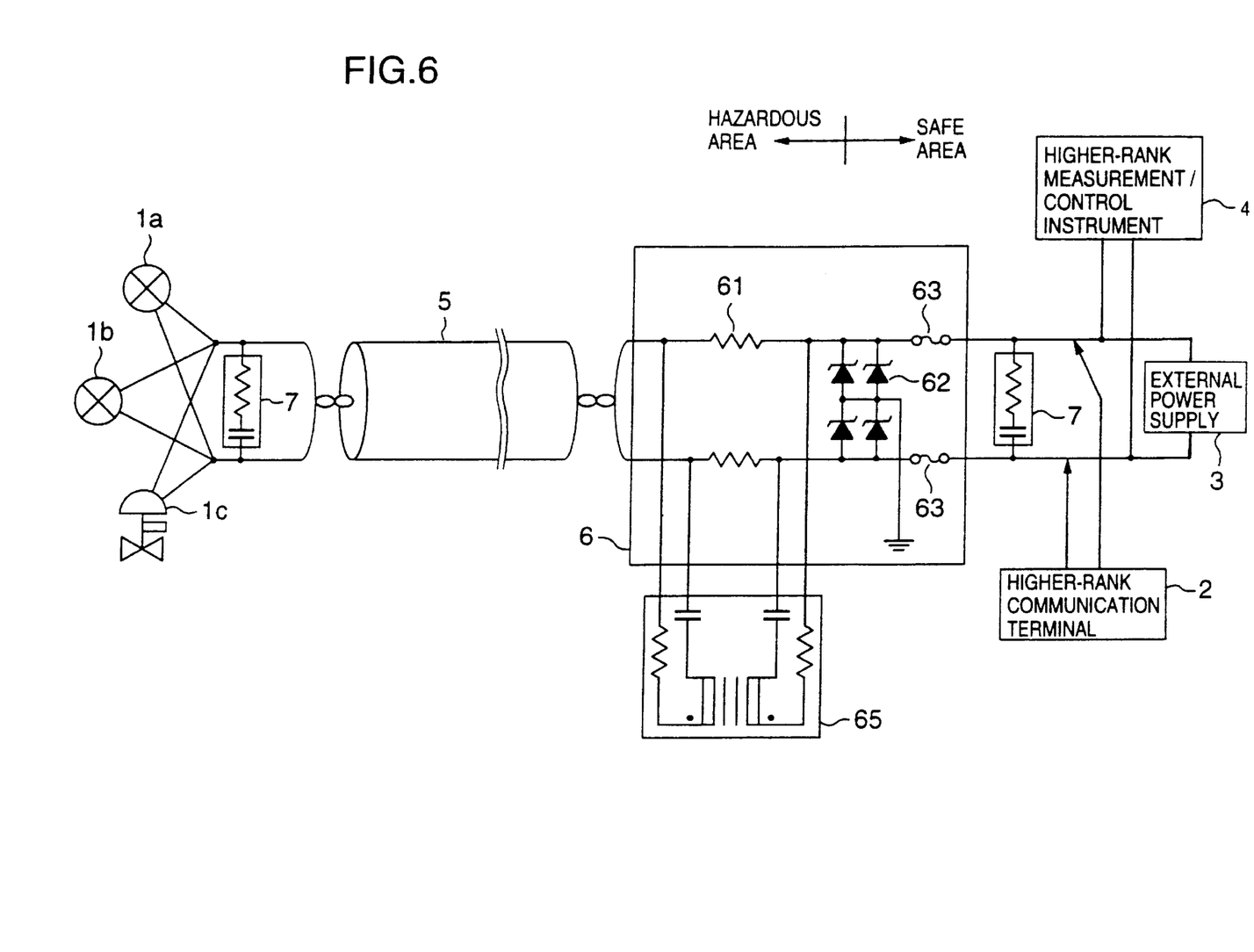
FIG. 6 shows a third embodiment of the present invention.

The operation of parts except the barrier 6 in each of the embodiments of FIGS. 5 and 6 is the same as that in the embodiment of FIG. 1. With respect to the inside of the barrier 6, the structure and operation of parts concerning intrinsic safety is the same as that in the embodiment of FIG. 1.

Zener diodes 62 serve to limit a voltage supplied from the external power supply 3 to a predetermined value when the voltage is applied to the transmission line 5 through the barrier 6. Generally, a plurality of Zener diodes 62 are connected in parallel as shown in FIG. 5 to satisfy the aforementioned function even in the case where failure occurs in one of the Zener diodes 62. Fuses 63 serve to protect excessive electric power consumed by the Zener diodes 62 at the time of occurrence of failure. Resistors 61 serve to suppress an excessive current from flowing in the transmission line 5 in case of failure, for example, when the transmission line 5 is short-circuited in the hazardous area. Accordingly, by means of the Zener diodes 62 and the resistors 61, the line voltage of the transmission line and the line current flowing in the transmission line can be suppressed so as not to be larger than predetermined values respectively. As a result, energy allowed to be used in the hazardous area can be always suppressed so as not to be larger than a predetermined value. The intrinsically safe system is provided by controlling the aforementioned predetermined values of energy to be in a level so that the gas or vapor to be subjected is not ignited.

Here, the communication signal is attenuated largely because of the internal resistance value of the barrier 6 inclusive of the resistors 61 and the fuses 63. In this embodiment, therefore, an impedance converting circuit 65 is connected in parallel to the internal circuit of the barrier 6 with respect to the transmission line to thereby reduce the total impedance of the barrier 6 in the communication frequency band.

FIG. 5 shows the second embodiment in which the impedance converting circuit 65 is included in the barrier 6, and FIG. 6 shows the third embodiment in which the impedance converting circuit 65 is connected to the outside of the barrier 6. Each of the impedance converting circuits 65 is constituted by capacitors, resistors and a transformer.

In the impedance converting circuit 65 in each of these embodiments, parts of the impedance converting circuit 65 are electrically insulated by the transformer. Accordingly, capacitors each having a capacitance value smaller than that in the impedance converting circuit of the first embodiment can be used for constituting the impedance converting circuit 65. Furthermore, from the point of view of intrinsic safety, the impedance converting circuit 65 can be made safer.

In the case of FIG. 6, the impedance converting circuit 65 can be connected to the barrier 6 from the outside. There arises an effect that not only the length of the transmission line allowed to be used under the intrinsically safe condition can be extended but also the number of field devices allowed to be connected can be increased easily.

Although FIG. 6 shows the case where the impedance converting circuit 65 is connected in parallel to the two resistors 61, there is no problem also in the case where the impedance converting circuit 65 is connected in parallel to the barrier 6 as a whole. The total impedance of the barrier can be reduced by connecting the impedance converting circuit 65 as described above.

Apparent from the above description, there arises an effect that not only the number of apparatuses allowed to be connected can be increased but also a reliable communication system can be formed easily by a low-cost structure when the field bus system is configured by using the barrier according to the present invention even in the case where energy is limited under the intrinsically safe condition.

Furthermore, there arises an effect that the allowed communication range concerning the external condition such as the length of the transmission line, the number of apparatuses to be connected, etc., can be widened.

What is claimed is:

1. In a field bus system for performing communication between at least one field device and at least one higher-rank apparatus which are connected on a field bus transmission line constituted by a pair of transmission lines, an intrinsically safe barrier disposed between a hazardous area and a safe area on said transmission line in order to limit energy to be used in said hazardous area, said intrinsically safe barrier comprising impedance converting circuits provided in said barrier for reducing impedance in a frequency band of communication data.

2. An intrinsically safe barrier according to claim 1, wherein said impedance converting circuits are connected in parallel to said transmission lines, respectively, of said transmission line.

3. An intrinsically safe barrier according to claim 2, wherein:

said barrier has a structure in which Zener diodes are provided in parallel to each other and between said transmission lines of said transmission line and load resistors are provided in series to said transmission lines of said transmission line respectively; and said impedance converting circuits are connected in parallel to said load resistors, respectively.

4. An intrinsically safe barrier according to claim 3, wherein each of said impedance converting circuits is constituted by a capacitor, an inductor, and a safety holding part.

5. An intrinsically safe barrier according to claim 1, wherein said impedance converting circuits are connected in parallel to each other and between said transmission lines of said transmission line so as to connect said transmission lines of said transmission line to each other.

6. An intrinsically safe barrier according to claim 5, wherein:

said barrier has a structure in which Zener diodes are provided in parallel to each other and between said transmission lines of said transmission line and load resistors are provided in series to said transmission lines of said transmission line respectively; and said impedance converting circuits are connected at opposite ends of said load resistors respectively, and in parallel to each other between said transmission lines of said transmission line.

7. An intrinsically safe barrier according to claim 1, wherein said impedance converting circuits are composed of a pair of load resistors, a pair of capacitors, a transformer, and a safety holding part.

8. An intrinsically safe barrier according to claim 1, wherein terminators are provided at opposite ends of said transmission line so as to be disposed on a safe area side and on a hazardous area side, respectively, with respect to said barrier.

9. An intrinsically safe barrier according to claim 8, wherein said terminator provided on said safe area side is included in said barrier.

10. A field bus system for performing communication between at least one field device and at least one higher-rank apparatus which are connected on a field bus transmission line constituted by a pair of transmission lines, said field bus system comprising an intrinsically safe barrier disposed between a hazardous area and a safe area on said transmission line in order to limit hazardous area side energy to a predetermined value to thereby reduce impedance in a frequency band of communication data exchanged between said field device and said higher-rank apparatus.

11. A field bus system according to claim 10, further comprising:

voltage limiting means provided in said barrier so as to connect said transmission lines of said transmission line;

surplus electric power consumption protecting means and voltage drop elements disposed so as to be connected in series to said transmission lines, respectively, of said transmission line; and impedance converting circuits connected in parallel with said voltage drop elements respectively to reduce impedance in a frequency band of communication data.

12. A field bus system according to claim 10, further comprising:

voltage limiting means provided in said barrier so as to connect said transmission lines of said transmission line;

surplus electric power consumption protecting means and voltage drop elements disposed so as to be connected in series to said transmission lines, respectively, of said transmission line; and impedance converting circuits connected to opposite ends of said voltage drop elements respectively and connected in parallel to said transmission line so as to connect said transmission lines of said transmission line to thereby reduce impedance in a frequency band of communication data.

13. A field bus system according to claim 10, wherein a signal obtained by superimposing a Manchester code signal pulsated in positive and negative directions with respect to a consumed current for operating said field device is used as a communication signal of said field device.

14. A field bus system according to claim 13, wherein the frequency band of said communication signal depends on the relation between communication rate and the power distribution of the Manchester code.

15. A field bus system according to claim 10, wherein terminators are provided at opposite ends of said transmission line so as to be disposed on a safe area side and on a hazardous area side, respectively, with respect to said barrier.

16. A field bus system according to claim 15, wherein said terminator provided on said safe area side is included in said barrier.

17. A field bus system for performing communication between at least one field device and at least one higher-rank apparatus which are connected on a field bus transmission line constituted by a pair of transmission lines, comprising an intrinsically safe barrier disposed between a hazardous area and a safe area on said transmission line in order to limit energy in said hazardous area to a predetermined value so that said communication is performed through said intrinsically safe barrier, wherein an impedance converting circuit is connected in parallel to said transmission line to reduce impedance in a frequency band of communication data exchanged between said field device and said higher-rank apparatus.

18. A field bus system according to claim 17, wherein said impedance converting circuit is disposed in the outside of said barrier so as to be detachable from said transmission line.

19. A field bus system according to claim 17, wherein said impedance converting circuit is connected in parallel to said barrier.

20. A field bus system according to claim 17, wherein said impedance converting circuit has four connection terminals which are disposed in said barrier and connected to opposite ends of voltage effect elements connected in series to said transmission lines of said transmission line.

* * * * *